(12) United States Patent
Myers

(10) Patent No.: US 6,375,326 B2
(45) Date of Patent: *Apr. 23, 2002

(54) FRESNEL IMAGE FLOATER

(75) Inventor: Kenneth J. Myers, 2 Main St., Apartment 2S, Dobbs Ferry, NY (US) 10522

(73) Assignees: Kenneth J. Myers; Edward Greenberg, both of Irvington, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/496,460

(22) Filed: Feb. 2, 2000

(51) Int. Cl.[7] ............................................... G02B 21/22
(52) U.S. Cl. ......................................... 353/10; 359/479
(58) Field of Search ..................... 353/28, 10; 359/458, 359/478, 479, 630

(56) References Cited

U.S. PATENT DOCUMENTS

| 4,398,810 A | | 8/1983 | Hodges et al. | |
| --- | --- | --- | --- | --- |
| 4,671,625 A | * | 6/1987 | Noble | 359/476 |
| 5,508,763 A | * | 4/1996 | Schulte | 353/10 |
| 5,526,146 A | | 6/1996 | Goodman et al. | |
| 5,639,151 A | | 6/1997 | McNelley et al. | |
| 5,726,806 A | * | 3/1998 | Holden et al. | 359/630 |
| 5,782,547 A | | 7/1998 | Machtig et al. | |
| 5,913,591 A | | 6/1999 | Melville | |
| 5,944,403 A | * | 8/1999 | Krause | 353/74 |
| 6,042,235 A | * | 3/2000 | Machtig et al. | 353/28 |

OTHER PUBLICATIONS

*Fresnel Lenses*, Fresnel Technologies, Inc., 1995, pps. 1–11.

* cited by examiner

*Primary Examiner*—William Dowling
(74) *Attorney, Agent, or Firm*—Bacon & Thomas, PLLC

(57) ABSTRACT

An image projection device includes a Fresnel lens positioned in an optical path of an illuminated image in such a way that light from the image passes twice through the Fresnel lens, once in each direction. The first optical element may be a planar mirror arranged to reflect light transmitted by said Fresnel lens in the first direction back through said Fresnel lens in the second direction. In addition, a second optical element may be provided for changing a path of light exiting said Fresnel lens in said second direction so that the projected image appears at a location away from the path of light from the image source to the Fresnel lens.

9 Claims, 2 Drawing Sheets

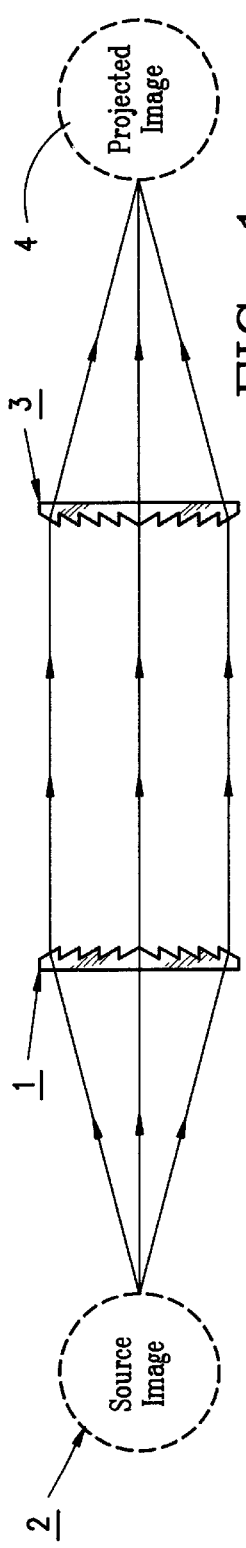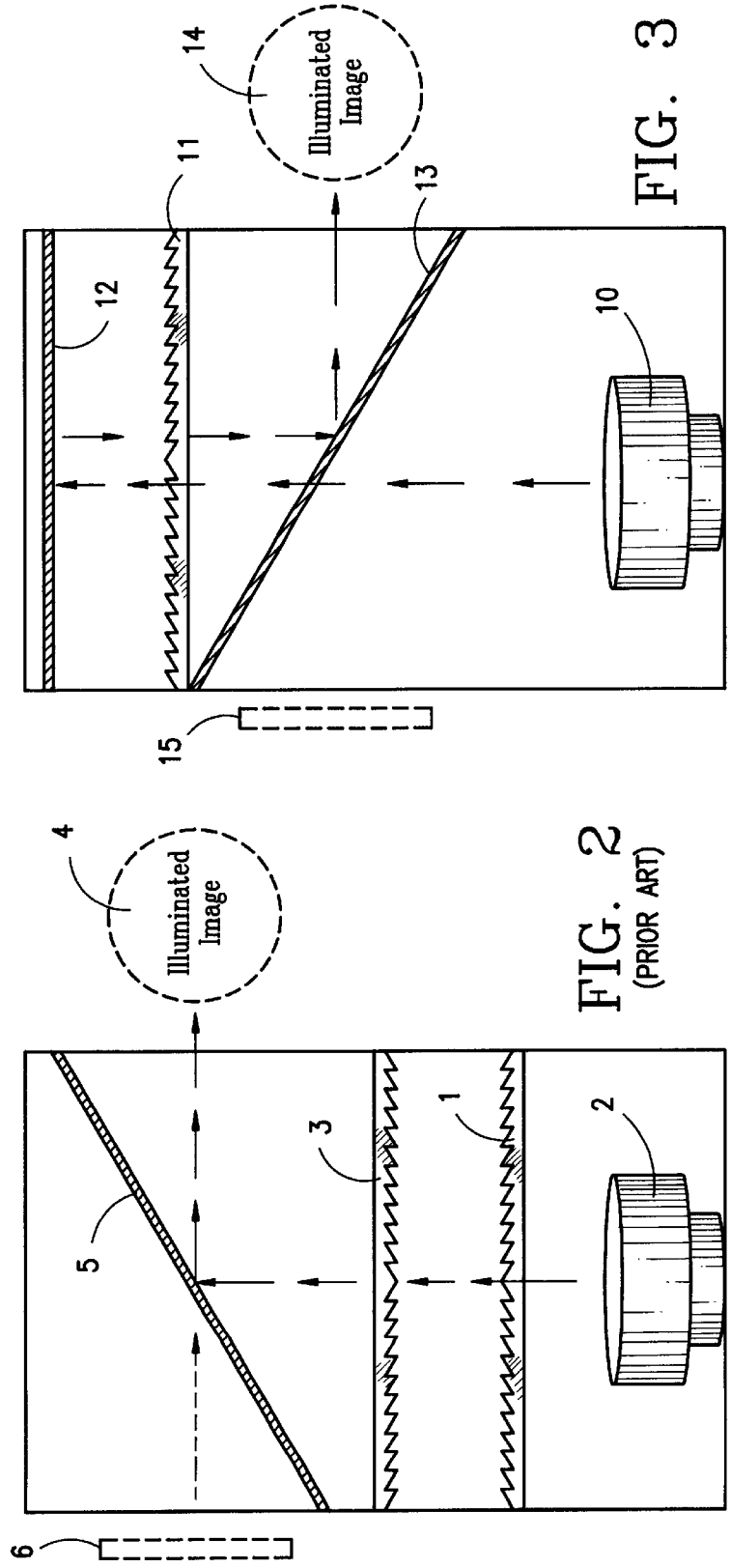
FIG. 1 (PRIOR ART)
FIG. 2 (PRIOR ART)
FIG. 3

FRESNEL IMAGE FLOATER

BACKGROUND OF THE INVENTION

1. Field of the Invention

This invention relates to an image projection device of the type known as an "image floater," in which an illuminated image is projected by optical elements to a position between the optical elements and an observer, the projected image appearing to float in free space.

More specifically, the invention relates to an image projection device which uses a Fresnel lens system to cause light rays from a source image to converge in front of the Fresnel lens and form a real image at the point of convergence. Similar image floaters are disclosed in U.S. Pat. Nos. 4,671,625 and 5,782,547, herein incorporated by reference.

The invention improves upon the image projection devices disclosed in U.S. Pat. Nos. 4,671,625 and 5,782,547 by replacing the pairs of Fresnel lenses disclosed in the prior patents with (i) a single Fresnel lens, and (ii) at least one light guiding element arranged to cause light rays from the image source to pass through the Fresnel lens once in each direction. By causing light rays from the image source to pass through the Fresnel lens twice, the single Fresnel lens performs the same functions as the respective pairs of lenses in the prior image projection devices, thereby simplifying the structure of the prior image projection devices without loss of performance.

2. Description of Related Art

"Image floaters" or image projection devices that project an image so that it appears to float in free space have been well known since at least the beginning of the last century. One way to achieve the image floater effect is to arrange optical elements such as parabolic mirrors or concave lenses so that they cause light rays originating from the source image to converge at a location between the optical element and the viewer, thereby forming a "real" at the location of convergence.

The present invention is an improvement to the image floaters disclosed in U.S. Pat. Nos. 4,671,625 and 5,782,547. Each patent proposes to replace the lenses and mirrors of earlier "image floaters" by a Fresnel lens system consisting of two positive focal length Fresnel lenses.

The principles of operation of the Fresnel image floaters are shown in FIG. 1. The illustrated Fresnel image floater includes two positive focal length Fresnel lenses which may, but are not required to be, identical in construction. The first positive focal length Fresnel lens 1 of the conventional arrangement is used as a collimator to direct light rays from points on a source image 2 to a second positive focal length Fresnel lens 3. The second positive focal length Fresnel lens 3 collects the light rays transmitted by the first positive focal length Fresnel lens and focuses them in front of the second Fresnel lens. The two lenses thus serve to direct and cause light rays from the source image to converge at locations in front of the second lens, so that a real image 4 appears in front of the second lens.

Although illustrated in FIG. 1 as a linear system, the Fresnel lens image floaters disclosed in U.S. Pat. Nos. 4,671,625 and 5,782,547 can actually have a wide variety of configurations, achieved by varying the path taken by light rays from the image source to the first Fresnel lens, and by varying the path of converging light rays exiting the second Fresnel lens. For example, as shown in FIG. 2, an optical component such as mirror 5 may be positioned to reflect light exiting the second Fresnel lens 3 to a location outside image floater. In general, mirrors lenses, and other optical elements or components may be positioned anywhere in the path of light from the image source to the location of the projected image, so as to vary the image path and accommodate different source image orientations and/or to change the position of the projected image.

Not only can the positions of the image source and projected image be varied by changing the path of light entering and exiting the Fresnel lens system, but additional images can be superimposed on the projected image. For example, as shown in FIG. 2, the light guiding mirror 5 may be a half-silvered or partially transmissive mirror, in which case mirror 5 serves as a beam splitter to combine a background image 6 with the projected image 4. U.S. Pat. No. 5,782,547, in particular, describes a number of ways to enhance such a background image by adding the illusion of depth to the background image, thereby complementing the three dimensional appearance of the projected image.

The present invention is in principle applicable to all of the various image floaters disclosed in U.S. Pat. Nos. 4,671,625 and 5,782,547, as well as to any other existing dual lens Fresnel image floater devices, differing from the prior arrangements solely in that it replaces the pair of lenses 1,3 shown in FIG. 1 with a Fresnel lens that performs a collimating function in one direction and a focusing function in the second. This is made possible by the property of Fresnel lenses (and other convex, positive focal length lenses) that the collimating lens can be a mirror image of the focusing lens, i.e., lens 1 shown in FIG. 1 is identical to lens 3, the only difference being the side on which the light rays are incident.

The "single" Fresnel lens arrangement of the present invention should not be confused with arrangements in which one of the two Fresnel lenses of the Fresnel image floater is simply eliminated without modifying the light path, so that light rays from a source image only pass once, rather than twice, through the remaining Fresnel lens. U.S. Pat. No. 5,782,547, for example, mentions such an arrangement in which the image floater is "configured without a second Fresnel lens." While the function of a deleted Fresnel lens can be emulated by optical elements such as concave mirrors or focusing lenses, such arrangements are nearly always disadvantageous because the elements that replace the Fresnel lens are likely be more complex, expensive, and/or less accurate than the Fresnel lens itself.

In contrast, in the present invention, a light ray passing twice through the Fresnel lens effectively "see" two Fresnel lenses, and thus the light ray is affected in exactly the same manner as in the dual-Fresnel image floaters, and without having to add any optical elements other than relatively simple (in comparison with concave mirrors and the like) guiding elements arranged to direct light rays transmitted by the Fresnel lens back through the lens. Thus, although U.S. Pat. No. 5,782,547 mentions an embodiment "configured without a second Fresnel lens," the embodiment without the second Fresnel lens is not analogous to the single Fresnel lens arrangement of the present invention, and is likely to result in a significant loss of brightness in the projected image.

Another image floater arrangement which utilizes only a single Fresnel lens and yet is not analogous to the image floater of the invention is disclosed in U.S. Pat. No. 5,944,403. In this arrangement, a concave mirror causes rays of light to start to converge before passing through the single Fresnel lens. Again, the light rays are not caused to pass through the Fresnel lens twice, once in each direction. In addition, the image floater device of U.S. Pat. No. 5,944,403 suffers the disadvantages that the concave mirror is expensive and difficult to align, and that the resulting image is a virtual rather than real image, so that the image appears to float behind the Fresnel lens, limiting the ability of the image to be projected outside the image floater device.

In summary, the present invention represents an improvement to the image projection devices disclosed in U.S. Pat. Nos. 4,671,625 and 5,782,547. The dual Fresnel lens arrangement disclosed in these patents is replaced by a Fresnel lens and light guide arranged to guide light through the Fresnel lens in two directions. Unlike other single Fresnel systems which do not provide for passage of light through the Fresnel lens in two directions, the Fresnel lens system of the invention offers identical performance to a dual lens Fresnel arrangement, as well as equivalent versatility, including the ability to vary the orientation and positions of the image source and projected image, the ability to add a background image with any desired image enhancements, and the ability to cascade multiple image floaters so as to provide series of images floating in free space at different positions.

SUMMARY OF THE INVENTION

It is accordingly a first objective of the invention to provide a simple and compact image projection device of the type in which an image is projected in front of the image projection device and appears to float in free space.

It is a second objective of the invention to provide an image floater having a simple and compact construction, in which the projected image can be formed anywhere inside or outside the device, which easily permits the addition of background images, and which also permits cascading of multiple image floaters to provide multiple floating images.

It is a third objective of the invention to provide an image floater that performs in exactly the same manner as conventional dual lens image floaters, has all of the versatility, and is at least as easy to assemble, low in cost, and reliable as the prior image floaters, and yet in which the image is formed utilizing a single Fresnel lens.

These objectives are achieved by providing an image projection device in which a single positive focal length Fresnel lens in positioned in an optical path of an illuminated image in such a way that light from the image passes twice through the lens, once in each direction, thereby emulating the effect of two positive focal length Fresnel lenses without the cost.

In a preferred embodiment of the invention, a first optical element in the form of a mirror is arranged to reflect light that has been transmitted through the Fresnel lens in a first direction back through the Fresnel lens in a second direction opposite the first direction, and a second optical element is provided for changing a path of light exiting the Fresnel lens in the second direction so that the projected image is formed at a location offset from the path of light from the image source to the Fresnel lens. In this embodiment, the second optical element may be, but is not limited to, a beam splitter arranged to transmit light directly to the Fresnel lens in the first direction, and to reflect light transmitted by said Fresnel lens in the second direction so that the reflected light can be caused to exit the image floater in a third direction transverse to the first and second directions.

Optionally, the image floater of the preferred embodiment may include a background image source positioned such that light from the background image source is transmitted through the beam splitter in the third direction so that the background image is visible together with the projected image. Alternatively, or in addition to the inclusion of a background image, the image projected by the preferred image floater may be combined with additional floating images resulting from cascading of multiple image floaters, i.e., by arranging multiple image floaters in series, so that the projected image from one image floater may be viewed through the beam splitters of subsequent image floaters.

BRIEF DESCRIPTION OF THE DRAWINGS

FIG. 1 is a schematic diagram showing an example of a conventional dual Fresnel image floater arrangement.

FIG. 2 is a side view showing a further example of a conventional dual Fresnel image floater arrangement.

FIG. 3 is a side view showing a Fresnel image floater constructed in accordance with the principles of a preferred embodiment of the invention.

DETAILED DESCRIPTION OF THE PREFERRED EMBODIMENTS

Figure 4:
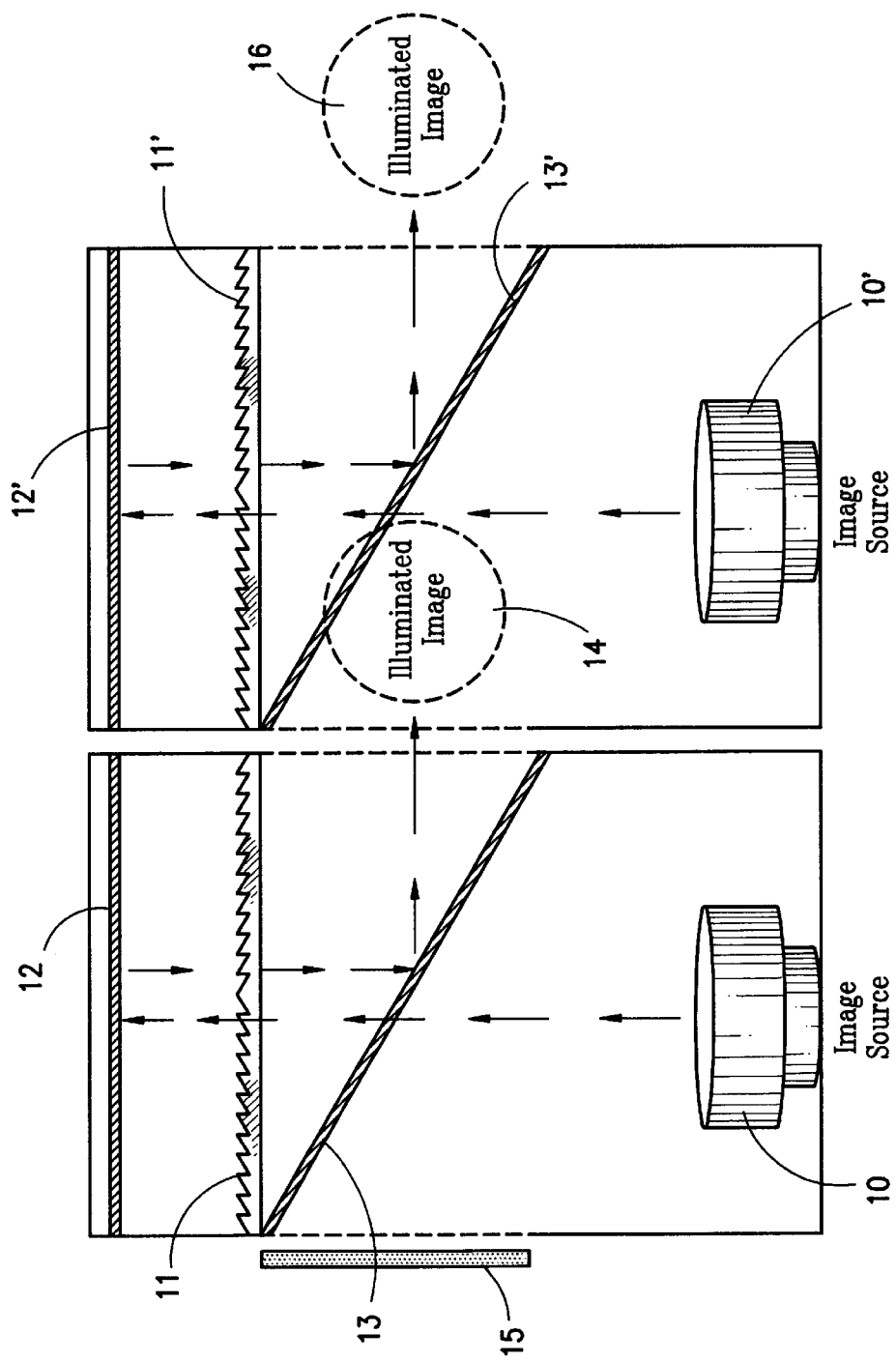
FIG. 4 is a side view showing a variation of the single Fresnel image floater arrangement of the preferred embodiment.

As illustrated in FIG. 2, an image floater constructed in accordance with the principles of a preferred embodiment of the invention includes an image source 10 and a Fresnel at lens 11. Also included in the image floater of the preferred embodiment of the invention are at least one first optical element 12 arranged to guide light that has already passed through the Fresnel lens in a first direction in such a manner that the light passes back through the Fresnel lens in a second direction opposite the first direction.

In addition to the image source 10, Fresnel lens 11, and at least one first optical element 12, the preferred image floater may include at least one second optical element 13 for directing light from the image source towards the Fresnel lens and/or away from the Fresnel lens, and/or for directing light that has passed twice through the Fresnel lens from the Fresnel lens towards the location at which the projected image 14 is to appear.

Those skilled in the art will appreciate that the image source 10 may be any illuminated object, including but not limited to three-dimensional objects as well as images on a display screen or video monitor such as a cathode ray tube, plasma display, or liquid crystal display, or duratrans, projection, lenticular, or photo images.

The Fresnel lens 11 is of known construction and preferably has a positive focal length chosen to cause the image to form at a desired location within or in front of the device, although it is in principle possible to provide a negative focal length Fresnel lens that causes a virtual image to appear behind the apparent position of the Fresnel lens. Any Fresnel lens may be used, including lenses formed of glass, plastic, or other transparent materials, with the grooves being arranged on a substrate in conventional fashion to form a lens having the desired optical properties.

In the illustrated embodiment, the first optical element is in the form of a simple planar mirror arranged to reflect light exiting the Fresnel for the first time back to the Fresnel lens. Since the light from the image initially enters the Fresnel lens from the rear, i.e., from the side facing away from the grooves, the Fresnel lens serves as a collimator corresponding to lens 1 illustrated in FIG. 1. However, light re-directed by the first optical element 12 back to the Fresnel lens enters the Fresnel lens from the grooved side and thus the Fresnel lens also serves as a collector corresponding to focusing lens 3 shown in FIG. 1.

In the example shown in FIG. 3, the second optical element 13 is illustrated as a beam splitter arranged to transmit light directly from the image source 10 to the Fresnel lens 11, and to reflect light to the location 14 at which the projected image is to be formed. Although illustrated as a single beam splitter situated at a 45° angle relative to the path of light from the image source to the Fresnel lens, those skilled in the art will appreciate that the second optical element could be replaced, without departing from the scope of the invention, by one or more lenses, mirrors, or other optical components and combinations thereof arranged to direct light from the image source to the Fresnel lens and/or to direct light away from the Fresnel lens to the location of the projected image, along any desired optical path.

For example, the image source may be arranged to emit light in a direction parallel or anti-parallel to the plane of the Fresnel lens, rather than perpendicular thereto, in which case appropriate optical elements could be arranged to cause a 90° change in the path of light from the image source to the Fresnel lens before the light is incident on the beam splitter 13. Alternatively, the beam splitter could be positioned to reflect light from the image source to the Fresnel lens and transmit focused light from the Fresnel lens to the location to which the image is projected, or multiple beam splitters could be used to combine images from multiple sources. In addition, the focal length of the Fresnel lens and the second optical elements may be chosen so that the projected image 14 falls inside rather than outside the image floater device as illustrated in FIG. 3.

Although the use of a simple planar mirror as the first optical element 12 provides an especially simple construction, it will also be appreciated that the first optical element could also be replaced by any desired combination of mirrors, lenses, and/or other optical components that direct light exiting the Fresnel lens back to the Fresnel lens, so that light passes through the Fresnel lens twice, once in each direction.

Furthermore, those skilled in the art will appreciate that although the present invention eliminates the need for a second Fresnel lens, such as used in the prior devices, additional Fresnel lenses could nevertheless be provided for purposes other than image collimation or convergence. For example, additional Fresnel lenses could be used for light guiding purposes in either the main or background image paths, or for otherwise enhancing the projected image formed by light that has passed twice through the main Fresnel lens 11.

As illustrated in FIG. 3, the image floater of the preferred embodiment is also capable of adding an optional background image to the projected image 14. The background image may be a fixed scene or a video image and, in the illustrated embodiment, is transmitted directly from a background image source 15 through the beam splitter 13 so as to appear in combination with the projected image 14. Those skilled in the art will appreciate that the optical path of the background image may, like that of the main image, be varied in order to permit more convenient positioning of the image source, and/or to permit enhancement of the background image. Examples of suitable background image sources include, but are not limited to cathode ray tubes, plasma or liquid crystal displays, duratrans, projection, lenticular, or photo images.

Further enhancements of the image floater effect may also be obtained, as illustrated in FIG. 4, by cascading or combining multiple image floaters, with the image 14 provided by the first image floater being combined with the image 16 projected by the second image floater so that the first projected image 14 appears to float behind the second projected image 16. The successive image floaters may be, but are not required to be, of identical construction and therefore the elements of the second image floater shown in FIG. 4 have been designated by primed reference numerals corresponding to those of FIG. 3. It will of course be appreciated that the number of cascaded image floaters is not limited to two.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

I claim:

1. A Fresnel image floater, comprising:
   an image source;
   a Fresnel lens arranged to transmit light rays in both a first direction and a second direction opposite the first direction and, when transmitting said light rays in said second direction, to converge said light rays to form a projected image at a focal point of said Fresnel lens; and
   at least one first optical element arranged to direct light rays initially transmitted by said Fresnel lens in said first direction back to the Fresnel lens for transmission by the Fresnel lens in said second direction in order to form said projected image at the focal of said Fresnel lens.

2. A Fresnel image floater as claimed in claim 1, wherein said first optical element is a mirror arranged to reflect light transmitted by said Fresnel lens in said first direction back through said Fresnel lens in said second direction.

3. A Fresnel image floater as claimed in claim 2, further comprising at least one second optical element for changing a path of light exiting said Fresnel lens in said second direction so that said projected image is formed at a location away from the path of light from the image source to the Fresnel lens.

4. A Fresnel image floater as claimed in claim 3, wherein said second optical element is a beam splitter arranged to transmit light to said Fresnel lens in said first direction and to reflect light transmitted by said Fresnel lens in said second direction, said reflected light exiting said image floater in a direction transverse to the first and second directions.

5. A Fresnel image floater as claimed in claim 4, further comprising a background image source positioned such that light from said background image source is transmitted through said beam splitter in said third direction so as to be visible together with said projected image.

6. A Fresnel image floater as claimed in claim 1, further comprising a background image source positioned such that light from said background image source is visible together with said projected image.

7. A Fresnel image floater as claimed in claim 1, further comprising at least one second optical element for changing a path of light exiting said Fresnel lens in said second direction so that said projected image if formed at a location away from the path of light from the image source to the Fresnel lens.

8. A Fresnel image floater as claimed in claim 7, wherein said second optical element is a beam splitter arranged to transmit light to said Fresnel lens in said first direction and to reflect light transmitted by said Fresnel lens in said second direction, said reflected light exiting said image floater in a direction transverse to the first and second directions.

9. A Fresnel image floater as claimed in claim 1, wherein said Fresnel lens is a positive focal length Fresnel lens.

* * * * *